United States Patent [19]

Kolodner et al.

[11] Patent Number: 5,781,330
[45] Date of Patent: Jul. 14, 1998

[54] HIGH EFFICIENCY OPTICAL SWITCHING AND DISPLAY DEVICES

[75] Inventors: Paul Robert Kolodner, Hoboken; Denis Lawrence Rousseau, Summit, both of N.J.

[73] Assignee: Lucent Technologies, Inc., Murray Hill, N.J.

[21] Appl. No.: 628,392

[22] Filed: Apr. 5, 1996

[51] Int. Cl.[6] .................................. G02F 1/153
[52] U.S. Cl. ........................................ 359/273
[58] Field of Search ............................ 359/273, 274

[56] References Cited

U.S. PATENT DOCUMENTS 4,611,890  9/1986  Elliot et al. .................. 350/357
5,279,932  1/1994  Miyasaka et al. .............. 430/495

*Primary Examiner*—Georgia Y. Epps
*Assistant Examiner*—Dawn-Marie Bey

[57] ABSTRACT

Applicants have discovered a new type of optical switching and display device using an active layer comprising electrochromic protein. In essence, the device comprises a cell composed of an electroded back wall and a transparent front wall including a transparent electrode region. A film comprising electrochromic protein is disposed between the two electrodes. In the absence of voltage between the two electrodes, the film reflects light of a first color. If a voltage is applied, the color of the reflected light changes. Because the device uses reflected light rather than transmitted light, backlighting is not required, and the device is highly efficient as compared with conventional LCDs.

23 Claims, 5 Drawing Sheets

WITH ALL-TRANS RETINAL      WITH 13-CIS RETINAL 5,781,330

HIGH EFFICIENCY OPTICAL SWITCHING AND DISPLAY DEVICES

FIELD OF THE INVENTION

The present invention relates to high efficiency optical switching and display devices and, in particular, to such devices using an active layer comprising electrochromic protein.

BACKGROUND OF THE INVENTION

The combination of microelectronic circuits and flat panel displays has led to a wide variety of portable electronic products. These products range from electronic watches to hand-held television receivers and laptop computers. Low power consumption is a critical requirement of each of them.

The most popular flat panel display is the liquid crystal display (LCD). In typical LCD cells, the application of a voltage switches a region of the display cell from a transparent state, constituting visual background, to a darkened state, representing a visual message.

A major shortcoming of the LCD is its low optical efficiency. There is relatively low visual contrast between the activated and unactivated portions of the display. As a consequence the display typically requires backlighting to enhance the visual contrast. Unfortunately backlighting consumes substantial power. Even in so complex an electronic system as a portable computer, the power used in display backlighting is the major drain on the system batteries. Accordingly, there is a need for an improved flat panel display device with reduced power consumption.

SUMMARY OF THE INVENTION

Applicants have discovered a new type of optical switching and display device using electrochromic protein. In essence, the device comprises an electroded back wall and a transparent front wall including a transparent electrode region. A film comprising electrochromic protein is disposed between the two electrodes. In the absence of voltage between the two electrodes, the film reflects light of a first color. If a voltage is applied, the color of the reflected light changes. Because the device uses reflected light rather than transmitted light, backlighting is not required, and the device is highly efficient as compared with conventional LCDs.

BRIEF DESCRIPTION OF DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

This description is divided into three parts. Part I describes the structure of the new display. Part II describes how the display is made, and part III, useful in making extensions of the invention, describes the theory behind the operation of bacteriorhodopsin.

I. Display Structures

Figure 1:
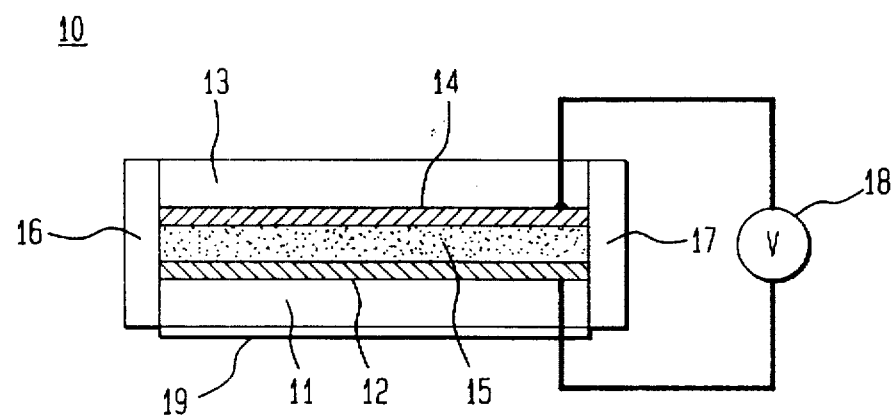
FIG. 1 is a schematic cross section of a simple optical switching cell in accordance with the invention.

Referring to the drawings, FIG. 1 is a schematic cross section of a simple optical switching cell 10 comprising a back wall 11 (preferably planar) having an electrode region 12 and a transparent front wall 13 having a transparent electrode region 14 which preferably overlaps a portion of electrode 12. Disposed between the cell back wall 11 and the cell front wall 13 is a film 15 comprising electrochromic protein. The cell is optionally sealed by side walls 16 and 17. A switchable voltage source 18 is connected between electrodes 12 and 14.

In a preferred embodiment, the back wall 11 can be glass with a photolithographically defined electrode 12 of indium-tin-oxide (ITO). Preferably the back portion of wall 11 is provided with a coating 19 which is either black or reflective. The transparent front wall can be glass with a transparent electrode 14 of ITO. The space between the front wall and the back wall is preferably in the range 1–100 micrometers.

While electrodes 12,14 are preferably on opposing walls as shown in FIG. 1, it is also possible to dispose both electrodes on one wall, e.g. the back wall 11 and still apply an activating voltage to the film 15.

The film of electrochromic protein preferably comprises a lipid bilayer including an embedded protein containing a chromophore such as retinal or a retinal analog. The most convenient source of such material is the membrane of certain mutant forms of the bacterium *H. salinarium*, e.g. the single mutant D85N and the double mutant D85,96N. These mutant forms are described in further detail in G. J. Turner et al., *Biochem.* 32, 1332 (1993) and J. Tittor et al., *Biophys J.* 67, 1682 (1994), both of which are incorporated herein by reference. Additional potentially useful mutant forms are D85A, D82D/D85R, R82Q/D85N and D85N/D212N described in H. Otto et al., *J. Biol. Chem.* 226, 18764 (1991) which is incorporated herein by reference. These bacterial membranes comprise the electrochromic protein bacteriorhodopsin which includes a chromophore comprising a Schiff base derivative of retinal.

Alternatively the material can be obtained from chemically treated membranes of mutated or non-mutated *H. salinarium*, for example membranes wherein the retinal chromophore has been replaced with a retinal analog. The technique for retinal extraction and substitution is described in B. M. Becher et al., *Biophys. J.* 19, 285 (1977) and E. London et al., *J. Biol. Chem.* 257, 7003 (1982), which are incorporated herein by reference. Exemplary retinal analogs include 13-trifluoromethylretinal described by M. Sheves et al., *Proc. Nat. Acad. Sci. USA* 83, 3262 (1986). Two additional analogs (13-demethyl-11,14-expoxyretinal and 13-demethyl-9,12-epoxyretinal) are described in M. Sheves et al., *Biochem.* 24, 1260 (1985).

The preferred film is membrane material from the mutant D85N bacterium. The film is advantageously oriented so that more than 50% and preferably more than 75% of the extracellular surface of the membrane faces the same direction.

While the bacterial material is most convenient, neither the lipid bilayer nor the protein are necessarily bacterial in origin. The protein can be isolated and incorporated into eukarotic or synthetic lipid bilayers. See A. W. Scotto et al., *Biochem.* 29, 7244 (1990) and M. Teintze et al., *Biophys. J.* 62, 54 (1992), both of which are incorporated herein by reference. Moreover the protein, by conventional recombinant techniques, can be expressed in *E. coli* or eukaryotic cells. See, for example, M. Pompejus et al., *Eur. J. Biochem.* 211, 27 (1993) which is incorporated herein by reference.

In absence of a voltage between the electrodes 12 and 14, the bacteriorhodopsin film appears blue in reflected light. When a small voltage in the range of 100 V is applied across the protein, the film appears yellow. Switching time for a substantial portion of the effect is 10 msec or less. As described in detail in Section III, below, this color switching is attributable to electric field induced Schiff base protonation and deprotonation.

Figure 2:
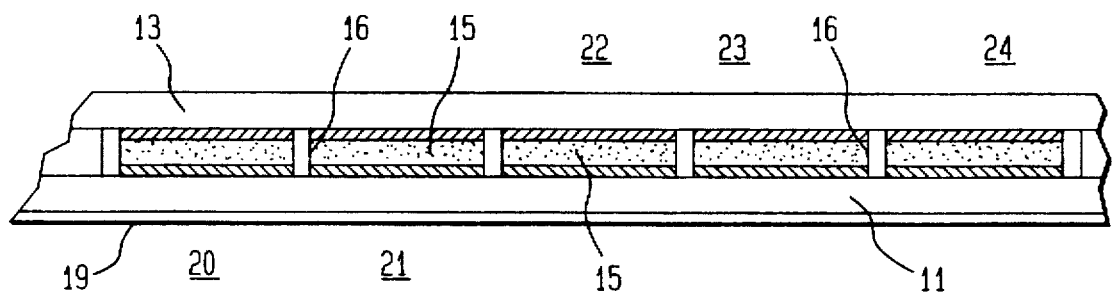
FIG. 2 is a cross section of an optical display device made up of switching cells of the type shown in FIG. 1.

An optical display can be made by forming an array of such cells. FIG. 2 illustrates such an array comprising a plurality of such cells (e.g. 20, 21, 22, 23, and 24) formed with a common back wall 11 and a common front wall 13. Spacers or pillars 16 are optionally provided at the periphery of each cell to maintain spacing between the walls. The dimensions of each cell can be chosen so that each cell defines a pixel. Voltage signals are switchably applied to each pixel cell in accordance with techniques well known in the art to provide an optical display.

The advantage of this display over conventional LCDs is that the inventive display is reflective—the pixels look like colored ink. Thus, the visual contrast is seen in the reflected ambient light, just as one sees a printed page. Thus, the display does not need its own light, and the power use is very low—essentially only the energy required to charge and discharge the pixel capacitances. In contrast, LCDs typically require a dedicated light source and have optical efficiencies of less than 1%.

II. Display Fabrication

The first step in fabricating an exemplary cell is to form and assemble the cell walls. The front and back walls can be formed by using conventional photolithographic processes to define the desired electrode structure on the respective walls.

The next step is to provide a suspension including an electrochromic protein. The suspension is most easily obtained as a suspension of plasma membrane material from mutant D85N *H. salinarium*. Membrane material is obtained by lysing the bacteria using detergent and separating the membrane component by centrifugation. The membrane component is then suspended in a low ionic conductivity medium. Growing the bacteria and extracting their membranes is described in BIM, Becher et al., *Prep. Biochem.* 5, 161 (1975) which is incorporated herein by reference.

The suspension is then applied to one of the electrodes. The second electrode is applied to contact the suspension and an electrical potential of 3–5 V is applied between the electrodes for 30–90 sec., using either electrode as the anode. Since patches of the plasma membrane are both negatively charged and polarized, they will orient in the field and migrate toward the anode where they stick. The films are permitted to dry, forming a highly oriented film containing electrochromic bacteriorhodopsin. This technique of coating is described in A. A. Kononenko et al., *Biochem. Biophys. Acta* 850, 162 (1986) which is incorporated herein by reference. The optical cell can then be sealed, as by adhering side walls in position.

Alternatively a different technique is contemplated in which the plasma membrane suspension is treated with different reactive molecules which attach to respectively opposite sides of the plasma membrane patches. One of the electrodes is then coated with a linker material which will selectively bind to the reactive molecule, producing one layer of the desired oriented film. The process should be multiply repeated to build up an optically thick (strongly colored) film.

III. Theory of Electrochromic Bacteriorhodopsin

The following is applicants' best current understanding of how an electrochromic protein such as bacteriorhodopsin produces electrochromic optical switching using field induced Schiff base protonation and deprotonation.

A. Structure and Functioning of Bacteriorhodopsin

Figure 3:
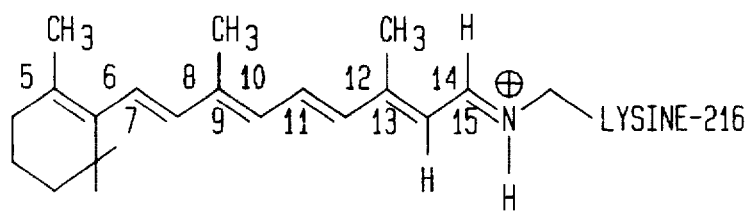
FIG. 3 is a structural diagram of retinal, the chromophore in electrochromic bacteriorhodopsin.

Bacteriorhodopsin ("BR") is a protein found in the cell membrane of the salt-loving bacterium *H. salinarium*. BR consists of seven α-helices which traverse the membrane, circumscribing a cross-membrane channel through which protons can be transported. The BR molecules trimerize in the membrane, forming large patches that can be easily isolated from the bacterium. These patches are purple in color and are therefore known as BR purple membranes. The active element of BR is the Schiff-base derivative of retinal, a small chromophore with a polyene chain. The structure of this chromophore is shown in FIG. 3. The retinal is bound to the protein by both non-bonded forces and a Schiff-base ($NH^+$) linkage to an amino acid of the protein. Normally, the polyene chain of the chromophore exhibits an all-trans isomerization state and lies at an angle with respect to the membrane plane. When BR is illuminated with yellow light, photoisomerization of the chromophore causes a conformational change from all-trans to 13-cis, triggering a photocycle which culminates in a proton being pumped across the membrane through the channel. This creates a pH gradient across the membrane which is utilized in the generation of energy by the bacterium.

Isolated retinal in solution is colorless, exhibiting an ultraviolet absorption peak centered at 380 nm. However, retinal bound into BR exhibits a strong purple color, corresponding to a shifted absorption peak centered at 570 nm. This opsin shift is due to electrostatic distortion of the retinal caused by the protein environment and by formation of the protonated Schiff base by which the chromophore is bound to the rest of the protein. The opsin shift can be followed in real time in experiments in which BR is made by mixing its component parts in solution. First, retinal is chemically removed from BR, thus isolating the protein part, which is known as bacterio-opsin. Then, the full molecule can be reconstituted by adding the retinal, or a retinal analog, to a solution of bacterio-opsin, and the absorption of the chromophore can be monitored as a function of time as it is incorporated into the protein. As this occurs, the chromophore's absorption peak decays and is replaced with a shifted peak, reflecting the electrostatic forces encountered inside the membrane channel. Experiments of this type have demonstrated that retinal analogues with different optical and chemical properties can be incorporated into the protein.

A very important property of the purple membrane ("PM") is the electric field that is generated across the membrane during the biological activity of BR. This field is in the range of $10^4$ to $10^5$ V/cm. Conversely, the application of an external electric field brings about small reversible shifts in the absorption maxima that are readily detected spectroscopically but are too small to be detected by visual observation. The shifts depend on the presence of some water in the film and are postulated to be a consequence of movement of the retinal and/or nearby amino acids.

Figure 4:
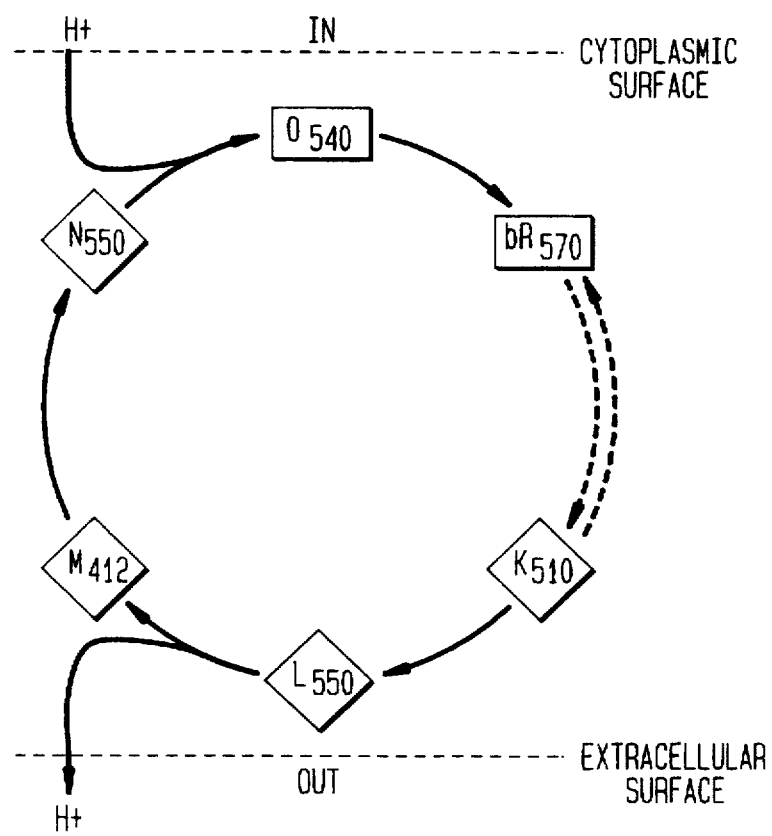
FIG. 4 is a block diagram illustrating the photocycle of bacteriorhodopsin.
Figure 4:
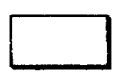
Figure 4:
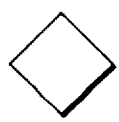

The BR photocycle, illustrated as a block diagram in FIG. 4, is triggered by the absorption of a photon in the $bR_{570}$ ground state. As indicated in FIG. 4, this event causes the retinal to photoisomerize, forming the 13-cis isomer in the $K_{610}$ state. This in turn triggers the rest of the photocycle, which is driven to completion at room temperature by thermal processes.

Figure 5:
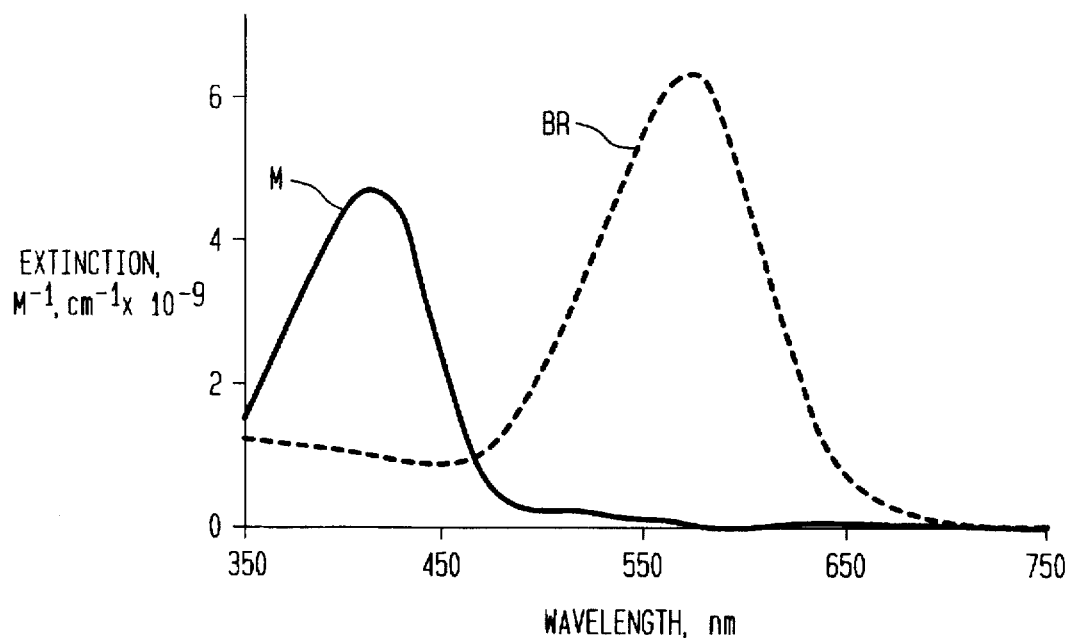
FIG. 5 is the absorption spectrum of bacteriorhodopsin.

The absorption spectrum is shown in FIG. 5. The curve designated BR shows the spectrum in the absence of excitation. The curve designated M shows the spectrum of the excited material. The most striking and important spectroscopic feature of the photocycle is the transient shift of the absorption peak from the red-green region in the initial $K_{610}$ and $L_{550}$ intermediates to the blue region in the $M_{412}$ state. It is known that this shift is caused by deprotonation of the Schiff base, which partially undoes the BR opsin shift. The succeeding $N_{560}$ state is produced by reprotonation of the Schiff base, and this shifts the absorption peak back towards the red. This is the slowest step of the photocycle, taking 5-10 ms under normal conditions. Subsequently, the chromophore reverts to its original isomerization state, and the molecule returns to its ground state, completing the photocycle. The deprotonation and reprotonation of the Schiff base are caused by a "bucket brigade" process in which protons are transferred across the membrane, fulfilling the physiological function of BR.

FIGS. 6(a) through 6(d) show a representation of several of the conformational states exhibited by BR during its photocycle, taken from the "molecular piston" model of Chou (K. C. Chou, Amino Acids 7, 1 (1994)). While this mechanistic model is rather simplistic, it gives insight into how BR can be modified so as to make the protonation state of the Schiff base sensitive to external electrical fields. In the ground state (FIG. 6(a)), the chromophore is in its all-trans isomerization state and is attached via the protonated Schiff base to residue 216 of the protein. The cross-membrane channel is closed and impermeable to water and protons. The carboxy groups on the aspartic acid residues 85 and 96 are prepared to play key roles in the photocycle as proton acceptor and donor, respectively.

In this model, the photoisomerization of the retinal about position 13 acts like the handle of a mechanical pump. The stored energy from the absorbed photon leads to a "power stroke" at this stage, causing the proton on the Schiff base to be released in the direction of residue 85 (FIG. 6(b)). The rest of the photocycle then proceeds via thermal processes. The spectroscopic $M_{412}$ state is formed when a proton is transferred (via a network of interchannel water molecules) from the Schiff base at residue 216 to the carboxy acceptor group at residue 85 (going from FIG. 6(b) to FIG. 6(c)). Subsequently, a protein conformational change causes the Schiff base to be reprotonated by the transfer of a proton from the carboxy donor group at residue 96 (FIG. 6(c) →FIG. 6(d)), forming the $N_{560}$ state. These events are accompanied by migration of a proton from residue 85 to the extracellular side of the membrane (FIG. 6(c) and of a proton from the cytoplasmic side of the membrane to residue 96 (FIG. 6(d)). The photocycle is then completed by the reisomerization of the retinal (FIG. 6(d)→FIG. 6(a)).

In the context of this model, we see that two alterations of the BR molecule might allow external control of the spectral shift corresponding to the formation and decay of the $M_{412}$ state: (1) chemical modification of the chromophore—such as by replacement of the retinal with a 13-cis analog—so that maintaining open access to the proton on the Schiff base does not require photoisomerization, and (2) genetic alteration of the protein, so that protonation and deprotonation of the Schiff base by exchange with donor and acceptor residues 96 and 85 are no longer thermodynamically favored. With these modifications, the protonation state of the Schiff base can be controlled by an external electric field.

The way the electric field may change the protonation state is to shift the protonation/deprotonation equilibrium of the Schiff base. The shift is expressed in terms of the pK, which is the midpoint pH of the acid/base titration. Thus, if a proton binding site has a pK of ~8 and an electric field can shift the pK to ~6, then at pH 7 the site will be protonated in the absence of the field and deprotonated in the presence of the field. In thermodynamical terms, the electric field has to change the binding energy of the proton by an amount of the order of kT. Taking the membrane thickness (5 nm) as the distance over which this field must act gives a lower bound of $5 \times 10^4$ V/cm for this field. Given that PM films of thicknesses less than 5-10 µm are not opaque, this yields a total voltage of 25 V required for switching. However, electric-field-induced changes of proton binding equilibrium in BR require much smaller fields. In suspensions, pK changes of up to 1 pH unit have been induced by electric fields of $2 \times 10^4$ V/cm (see K. Tsuji et al., Eur. Biophys. J. 18, 63 (1990)). These were detected by monitoring the pH of the solution during and after a voltage pulse. Two different proton binding sites with a different sensitivity to the electric field were detected. Given the much higher field estimate just given, it is not clear how thermal noise was overcome to give such a large pK change is these experiments.

B. D85N BR Films

It is applicants' belief that BR variants with Schiff-base protonation equilibria at low pK values (pK in the less than about 10 as opposed to pK>12.5 observed in the wild type protein) will provide the most likely candidates for bacteriorhodopsin which is electrochromic. Mutants with low Schiff base pK values are described in H. Otto et al., Proc. Nat. Acad. Sci. USA 87, 1018 (1990) and T. Marti et al., J. Biol. Chem. 266, 18764 (1991). The D85N mutant H. salinarium provides blue membranes of D85N BR which can be used to make electrochromic active layers.

Figure 7:
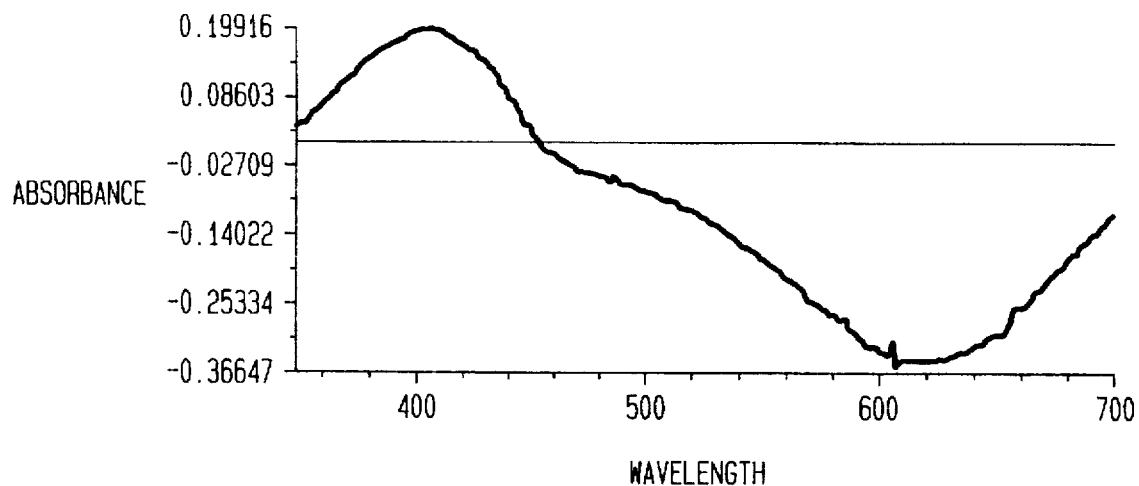
FIG. 7 shows a pH-induced difference spectrum of an unoriented film of D85N bacteriorhodopsin.

FIG. 7 shows a pH-induced difference spectrum of an unoriented film of D85N BR. This film was prepared by allowing a drop of suspension of D85N membranes to dry on a glass slide covered with a thin, transparent indium-tin oxide electrode. This process produces an unoriented film; that is, one which consists of approximately equal numbers of BR membranes with the cytoplasmic side facing towards ("up") and away from ("down") the substrate. Plotted as a function of wavelength is the difference between the optical absorption measured after equilibration with buffer solutions at two different pH values: pH 8 and pH 12. The unambiguous effect of increasing the pH from 8 to 12 is to remove the Schiff-base proton in a fraction of the BR molecules; this causes a decrease in the height of the absorption peak centered near 600 nm (protonated Schiff base) and an increase in the height of the peak centered near 400 nm (deprotonated Schiff base).

Figure 8:
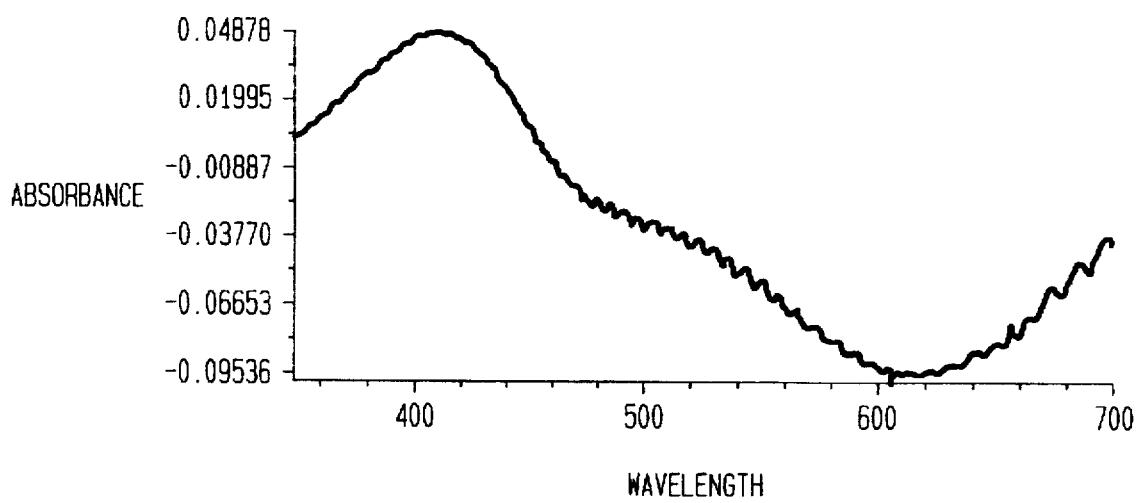
FIG. 8 shows an electric-field induced difference spectrum of an unoriented film of D85N bacteriorhodopsin.

FIG. 8 shows an electric-field-induced difference spectrum made using a similar, non-oriented D85N BR film. The quantity plotted is the difference between the absorption spectra in the presence and in the absence of an electric field. The nearly identical shapes of the pH- and electric-field-induced difference spectra show that the electric field acts to remove the proton from the Schiff base in some fraction of the BR molecules in the film. This is the basis of the electrochromic effect.

Figure 9:
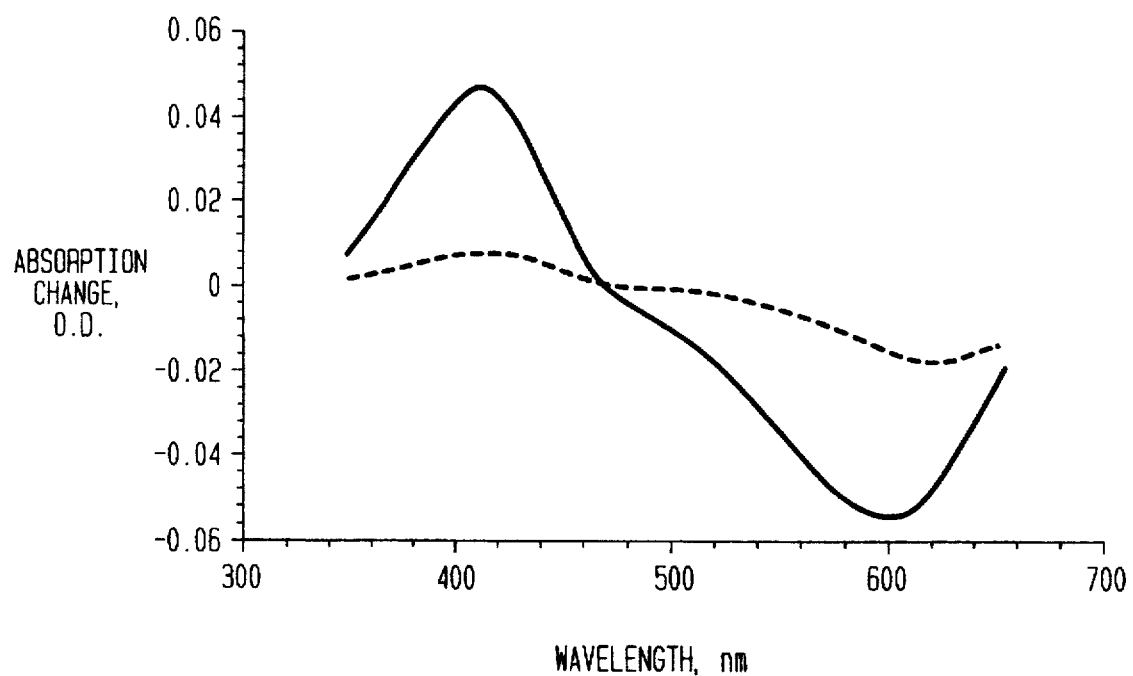
FIG. 9 shows the effect of electric-field polarity on the optical absorption spectrum of an oriented film of D85N bacteriorhodopsin.
Figure 6A:
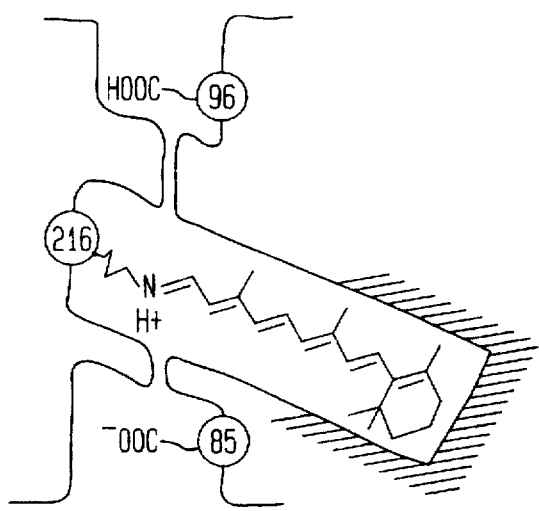
FIG. 6 illustrates the sequence of conformational states exhibited by bacteriorhodopsin during its photocycle.
Figure 6B:
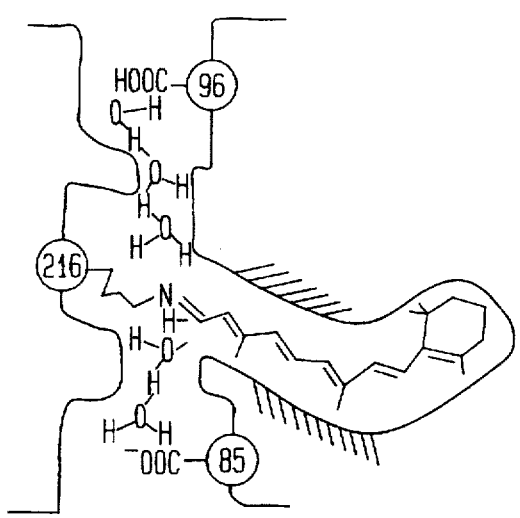
Figure 6D:
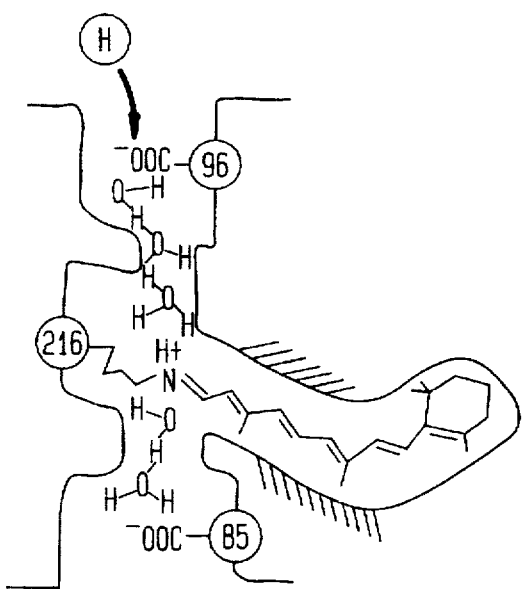
Figure 6C:
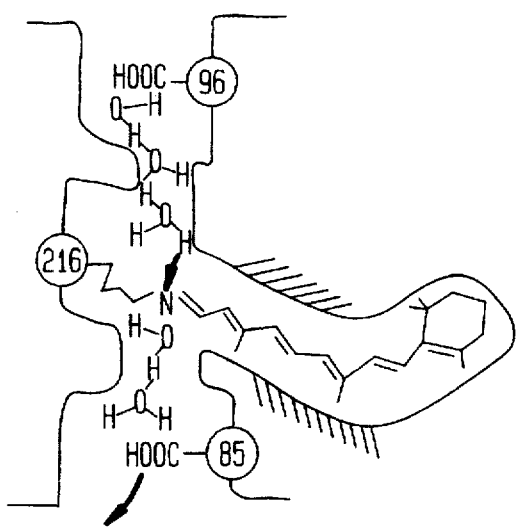

FIG. 9 shows the effect of electric-field polarity on the optical absorption spectrum of an oriented D85N BR film. The solid curve shows the absorption spectrum for the substrate electrode positive. The dotted curve shows the spectrum for the substrate negative.

The results of FIGS. 7-9 clearly show that the application of an electric field to films of D85N BR results in the deprotonation of the Schiff base in a fraction of the BR molecules, producing a large electrochromic color change.

It is to be understood that the above-described embodiments are illustrative of only a small number of many possible specific embodiments which can represent applications of the invention. Numerous and varied other arrangements can be made by those skilled in the art without departing from the spirit and scope of the invention.

We claim:

1. An optical switching device for changing color upon application of voltage consisting of:
   a backwall; a transparent front wall; a layer of electrochromic protein disposed between said back wall and said front wall, and a pair of electrodes for applying a voltage to said layer, thereby changing the absorption peak of said layer of electrochromic protein to effect color changes in response to the application of voltage.

2. An optical switching device according to claim 1 wherein a first of said pair of electrodes is disposed on said back wall and the second of said pair of electrodes is disposed on said front wall, said second electrode comprising a transparent conductive region.

3. An optical switching device according to claim 1 wherein said electrochromic protein comprises a protein including a chromophore.

4. An optical switching device according to claim 1 wherein said layer comprising electrochromic protein comprises a lipid bilayer and said electrochromic protein embedded in said bilayer.

5. An optical switching device according to claim 1 wherein said electrochromic protein is bacteriorhodopsin.

6. An optical switching device according to claim 1 wherein said layer comprising electrochromic protein comprises bacterial membrane material.

7. An optical display device comprising a plurality of optical switching devices according to claim 1, or 2, or 3, or 4, or 5, or 6.

8. An optical switching device for changing color upon application of voltage comprising:
   a backwall;
   a transparent front wall;
   a layer of electrochromic material disposed between said back wall and said front wall, said electrochromic material comprising a material capable of electric field induced Schiff based protonation and deprotonation for changing the absorption peak of said electrochromic material to effect color changes in response to the application of voltage, and
   first and second electrodes for applying a voltage to said layer of electrochromic material to induce protonation or deprotonation of the Schiff base of the electrochromic material.

9. An optical switching device according to claim 8 wherein said first electrode is disposed on said back wall and said second electrode is disposed on said front wall, said second electrode comprising a transparent conductive region.

10. An optical switching device according to claim 8 wherein said electrochromic layer comprises a lipid bilayer.

11. An optical switching device according to claim 8 wherein said electrochromic layer comprises bacterial membrane material.

12. An optical switching device according to claim 8 wherein said electrochromic layer comprises a lipid bilayer containing electrochromic protein.

13. An optical switching device according to claim 8 wherein said electrochromic layer comprises bacteriorhodopsin.

14. An optical switching device according to claim 8 wherein said electrochromic layer comprises membrane material and an electrochromic protein containing a chromophore.

15. An optical switching device according to claim 8 wherein said electrochromic layer comprises a protein containing retinal or a retinal analog.

16. An optical switching device according to claim 8 wherein said electrochromic layer comprises a protein containing 13-trifluoromethylretinal.

17. An optical switching device according to claim 8 wherein said electrochromic layer comprises a protein containing 13-demethyl-11,14-epoxyretinal.

18. An optical switching device according to claim 8 wherein said electrochromic layer comprises a protein containing 13-demethyl-9,12-epoxyretinal.

19. An optical switching device according to claim 8 wherein said electrochromic layer comprises membrane material from mutant D85N H. Salinarium bacteria.

20. An optical switching device according to claim 8 wherein said electrochromic layer comprises bacterial membrane material having a cytosolic surface and an extracellular surface, and said layer is oriented so that more than 75% of said extracellular surface faces the same direction.

21. An optical display device comprising a plurality of optical switching devices according to claim 8, or 9, or 10, or 11, or 12, or 13, or 14, or 15, or 16, or 17, or 18, or 19, or 20.

22. A method of performing optical switching, comprising the steps of:
   providing an optical switching cell comprising a back wall, a front wall, a layer of electrochromic material between said back wall and said front wall, and a pair of electrodes for applying a voltage to said layer, said electrochromic material being capable of electric field induced Schiff based protonation and deprotonation; and
   activating said electrodes to apply an electrical field to said layer of electrochrornic material to induce protonation and deprotonation of the Schiff base of the electrochromic material to change the absorption peak of the electrochromic material and the color of light transmitted by said layer of electrochromic material.

23. A method of providing an optical display device, comprising the steps of:
   providing a plurality of optical switching cells comprising a back wall, a front wall, a layer of electrochromic material between said back wall and said front wall, and a pair of electrodes for applying a voltage to said layer, said electrochromic material being capable of electric field induced Schiff based protonation and deprotonation; and
   activating said electrodes to apply an electrical field to said layer of electrochromic material to induce protonation and deprotonation of the Schiff base of the electrochromic material to change the absorption peak of the electrochromic material and the color of light reflected by said layer of electrochromic material.

* * * * *